US011031892B2

(12) United States Patent
Park

(10) Patent No.: US 11,031,892 B2
(45) Date of Patent: Jun. 8, 2021

(54) APPARATUS AND METHOD FOR DETECTING OVERLOAD OF BLDC MOTOR

(71) Applicants: HYUNDAI MOTOR COMPANY, Seoul (KR); KIA MOTORS CORPORATION, Seoul (KR)

(72) Inventor: Choong Seob Park, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 116 days.

(21) Appl. No.: 16/508,689

(22) Filed: Jul. 11, 2019

(65) Prior Publication Data
US 2020/0169203 A1     May 28, 2020

(30) Foreign Application Priority Data
Nov. 22, 2018   (KR) ................ 10-2018-0145096

(51) Int. Cl.
| H02P 21/22 | (2016.01) |
| H02P 27/12 | (2006.01) |
| H02P 21/18 | (2016.01) |
| H02P 21/14 | (2016.01) |

(52) U.S. Cl.
CPC ............ *H02P 21/22* (2016.02); *H02P 21/141* (2013.01); *H02P 21/18* (2016.02); *H02P 27/12* (2013.01)

(58) Field of Classification Search
CPC ........ H02P 21/141; H02P 21/18; H02P 21/22; H02P 27/12; H02P 29/027
See application file for complete search history.

(56) References Cited

U.S. PATENT DOCUMENTS

| 4,368,411 | A | * | 1/1983 | Kidd ................... H02P 6/24 318/400.09 |
| 4,532,461 | A | * | 7/1985 | Crook .................. H02P 6/12 318/400.12 |
| 5,446,354 | A | * | 8/1995 | Hiruma ............. G01R 31/34 318/400.21 |
| 5,574,346 | A | * | 11/1996 | Chavan ............. G01R 31/34 318/434 |
| 6,067,960 | A | * | 5/2000 | Watanabe ............ H02P 6/28 123/399 |
| 6,915,194 | B2 | * | 7/2005 | Kodama ............. B62D 5/008 180/422 |
| 8,947,028 | B2 | * | 2/2015 | Gu ................... H02P 29/0243 318/400.02 |
| 9,372,236 | B2 | * | 6/2016 | Lee .................. G01R 31/343 |
| 10,505,490 | B2 | * | 12/2019 | Sumita ............... H02P 21/18 |
| 2019/0028046 | A1 | * | 1/2019 | Aoki .................. H02P 6/28 |

* cited by examiner

*Primary Examiner* — Thai T Dinh
(74) *Attorney, Agent, or Firm* — McDonnell Boehnen Hulbert & Berghoff LLP

(57) ABSTRACT

The present disclosure provides a brushless direct current (BLDC) motor overload detection apparatus. The BLDC motor overload detection apparatus includes a measurer for measuring a 3-phase current value applied to the BLDC motor to derive a sector value matched with the 3-phase current value, a determiner for determining whether the sector value is normal by comparing the sector value derived by the measurer with a previous sector value that is previously measured, and a driving controller for controlling driving of the BLDC motor according to whether the BLDC motor has a fault, determined by the determiner.

11 Claims, 6 Drawing Sheets

APPARATUS AND METHOD FOR DETECTING OVERLOAD OF BLDC MOTOR

CROSS REFERENCE TO RELATED APPLICATION

This application claims under 35 U.S.C. § 119(a) the benefit of priority to Korean Patent Application No. 10-2018-0145096 filed on Nov. 22, 2018, the entire contents of which are incorporated herein by reference.

BACKGROUND

(a) Technical Field

The present disclosure relates to an apparatus and method for detecting overload of a brushless direct current (BLDC) motor, for determining whether the BLDC motor stalls, using a sector value derived through a 3-phase current value of the BLDC motor.

(b) Background Art

A brushless direct current (BLDC) motor is created by removing a brush, functioning as a commutator, from a general direct current (DC) motor while maintaining the properties of the DC motor. The BLDC motor is configured to include a stator including three-phase coils (U-phase coil, V-phase coil, and W-phase coil) and a rotor including a permanent magnet.

The BLDC motor is configured to allow current to flow in each phase of a coil at a stator side of a 3-phase BLDC motor and to generate a magnetic field in a coil by the current to rotate the rotor. In this case, the BLDC motor sequentially turns on and off switching devices for detecting the intensity of a magnetic field of the rotor and switching the direction of current flowing in each phase of a coil depending on the detected intensity of the magnetic field to continuously rotate the rotor in one direction. In general, to measure the position of a rotor, a method using a rotor position detection sensor device (a hall sensor, an encoder, etc.), a sensorless method using a back electro motive force (BEMF) method, or a sensorless method using vector control is used.

However, when a position detection sensor device is used, the cost of a device for detection of overload of a BLDC motor is increased. In addition, in the sensorless method using vector control, even if a BLDC motor stalls, current continuously flows in the BLDC motor, and thus it is difficult to accurately detect stalling of the BLDC motor.

SUMMARY

In one aspect, the present disclosure provides an apparatus and method for detecting overload of a brushless direct current (BLDC) motor, for determining whether the BLDC motor stalls, using a sector value without a separate rotor position detection sensor.

In a preferred embodiment, an apparatus for detecting overload of a brushless direct current (BLDC) motor includes a measurer for measuring a 3-phase current value applied to the BLDC motor to derive a sector value matched with the 3-phase current value, a determiner for determining whether the sector value is normal by comparing the sector value derived by the measurer with a previous sector value that is previously measured, and a driving controller for controlling driving of the BLDC motor according to whether the BLDC motor has a fault, determined by the determiner.

In another preferred embodiment, the sector value may be increased stepwise within one period of the 3-phase current value when the BLDC motor is in a normal condition.

In still another preferred embodiment, when the sector value and the previous sector value are different by a predetermined number, the determiner may determine that the BLDC motor is normal, and when the sector value and the previous sector value are not different by the predetermined number, the determiner may determine that the BLDC motor is abnormal.

In yet another preferred embodiment, upon determining that the BLDC motor is abnormal, the determiner may determine that an error occurs in the BLDC motor, and when a value obtained by adding the number of times an error occurs to an initialization value is greater than a predetermined threshold value, the determiner may determine that the BLDC motor stalls.

In still yet another preferred embodiment, the determiner may apply a weight to the number of times an error occurs and may determine whether a current error value, which is a value obtained by adding the number of times an error occurs to the initialization value, is greater than the predetermined threshold value.

In a further preferred embodiment, upon determining that the BLDC motor is normal, the determiner may determine that an error does not occur in the BLDC motor, and when a value obtained by adding the number of times an error occurs to an initialization value is equal to or less than a predetermined threshold value, the determiner may repeatedly determine whether the sector value is normal.

In another aspect, the present disclosure provides a method of detecting overload of a brushless direct current (BLDC) motor, the method including measuring a 3-phase current value applied to the BLDC motor to derive a sector value matched with the 3-phase current value, determining whether the sector value is normal or abnormal by comparing the derived sector value and a previous sector value that is previously measured, when the sector value is abnormal, determining that an error occurs and counting the number of times an error occurs, and determining whether the BLDC motor stalls based on the number of times an error occurs.

In another preferred embodiment, the determining whether the BLDC motor stalls based on the number of times an error occurs may include determining that the BLDC motor stalls when the number of times an error occurs is equal to or greater than a predetermined threshold value.

In still another preferred embodiment, the determining whether the sector value is normal or abnormal may include, when the sector value and the previous sector value are different by a predetermined number, determining that the BLDC motor is normal, and when the sector value and the previous sector value are not different by the predetermined number, determining that the BLDC motor is abnormal.

In yet another preferred embodiment, the determining that an error occurs and counting of the number of times an error occurs when the sector value is abnormal may include subtracting the number of times an error occurs corresponding to a predetermined number from a previous error value when the BLDC motor is normal, and adding the number of times an error occurs corresponding to a predetermined number to the previous error value when the BLDC motor is abnormal.

In still yet another preferred embodiment, the determining whether the BLDC motor stalls based on the number of times an error occurs may include determining whether a current error value obtained by adding or subtracting the number of times an error occurs corresponding to a predetermined number, to or from the previous error value, is equal to or greater than a predetermined threshold value.

In a further preferred embodiment, the method may further include re-comparing the current error value and the previous error value when the current error value is equal to or less than a predetermined threshold value.

In a still further preferred embodiment, the method may further include controlling velocity of the BLDC motor to 0 upon determining whether the BLDC motor stalls based on the number of times an error occurs.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION

Figure 1:
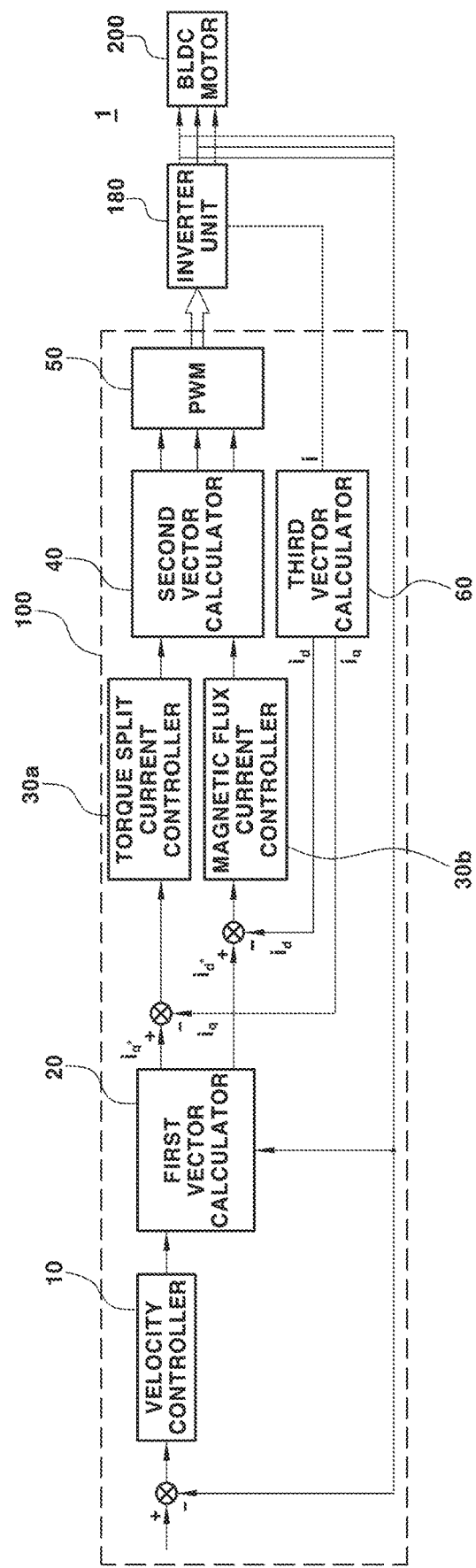
FIG. 1 is a diagram showing a sensorless vector control system according to an exemplary embodiment of the present disclosure.

The attached drawings for illustrating exemplary embodiments of the present disclosure are referred to in order to gain a sufficient understanding of the present disclosure, the merits thereof, and the objectives accomplished by the implementation of the present disclosure. The disclosure may, however, be embodied in many different forms and should not be construed as being limited to the embodiments set forth herein; rather, these embodiments are provided so that this disclosure will be thorough and complete, and will fully convey the concept of the disclosure to one of ordinary skill in the art. Meanwhile, the terminology used herein is for the purpose of describing particular embodiments and is not intended to limit the disclosure. Like reference numerals in the drawings denote like elements.

Further, the terms such as "unit", "module", etc. disclosed in the specification mean units for processing at least one function or operation, which may be implemented by hardware, software, or a combination thereof.

Additionally, the terms such as first and second used to describe the components of the present disclosure are solely for the purpose of differentiating one component from another, and the present disclosure is not limited to the order in the following description.

The detailed description of the present disclosure is for the purpose of exemplifying the present disclosure. In addition, the detailed description of the present disclosure is described with regard to exemplary embodiments of the present disclosure and the present disclosure can be used in various other combinations, modifications, and environments. That is, the present disclosure can be modified or changed within the scope of the concept of the present disclosure, the equivalent scope of the present disclosure, and/or the scope of the art or knowledge to which the present disclosure pertains. The present disclosure is for describing an optimum state for embodying the technological idea of the present disclosure and can be modified in various forms required in detailed application fields and uses. Accordingly, the detailed description of the present disclosure is not intended to limit the disclosure. In addition, it should be interpreted that the appended claims contain other exemplary embodiments.

FIG. 1 is a diagram showing a sensorless vector control system according to an exemplary embodiment of the present disclosure.

Referring to FIG. 1, a sensorless vector control system 1 may include a microcontroller (MCU) 100, an inverter unit 180, and a brushless direct current (BLDC) motor 200. The sensorless vector control system 1 may be used to detect whether the BLDC motor 200 stalls without a rotor position detection sensor such as a hall sensor. Vector control refers to a method of controlling velocity and torque via current control using a method of splitting current supplied to a stator into torque split current $i_q$ and magnetic flux split current $i_d$ and controlling the current. Since the sensorless vector control system 1 does not include a velocity control detection sensor, the sensorless vector control system 1 is not capable of receiving the actual velocity of the BLDC motor 200 as feedback, and thus, a value approximating the actual velocity may be estimated through a calculation operation of estimating the velocity via phase current of the BLDC motor 200 and may be compensated for to control velocity and torque.

The MCU 100 may control the current supplied to the BLDC motor 200 to directly control the velocity and torque of the BLDC motor 200.

A velocity controller 10 may control the velocity of torque split current $i_q$*. In vector control, magnetic flux split current $i_d$* may be constantly controlled, and thus, the velocity controller 10 may control only the torque split current $i_q$*.

To estimate an angle of a stator and a position of a rotor, counter electromotive force of the BLDC motor 200 may be used, and may be calculated by a first vector calculator 20. The first vector calculator 20 may estimate a magnetic flux angle through current supplied to the BLDC motor 200 from the inverter unit 180. In addition, the first vector calculator 20 may measure the current supplied to the BLDC motor 200 to estimate the mechanical angle of the BLDC motor 200. Estimation of the mechanical angle refers to estimation of a rotor position. Information on the magnetic flux angle and the electrical angle estimated through the first vector calculator 20 may be transmitted to a torque split current controller 30a and a magnetic flux current controller 30b.

A third vector calculator 60 may select two currents from 3-phase currents output from the inverter unit 180 to generate coordinate-transformed currents $I_α$ and $I_β$. The αβ coordinate system is a two-dimensional (2D) fixed coordinate system using fixed axes α and β as axes. The α axis and the β axis are orthogonal to each other, and the β axis precedes the α axis by 90°. The α axis is an axis that matches an axis (the U axis) corresponding to a U-phase winding. The third vector calculator 60 may perform a vector operation on the coordinate-transformed currents $I_α$ and $I_β$ to generate a detected current value ($i_q$, $i_d$) using information such as 3-phase alternating current (AC) current supplied to the BLDC motor 200 and an estimated magnetic flux angle. The dq coordinate system is a 2D rotary coordinate system based on rotation axes d and q. In a rotary coordinate system that rotates at the same speed as the rotation speed of a magnetic flux formed by a permanent magnet of the BLDC motor 200, an axis based on a direction of the magnetic flux formed by the permanent magnet is the d axis, and an axis that precedes the d axis by a phase of 90° is the q axis.

The torque split current controller 30a may output new torque split current obtained by subtracting the detected current value $i_q$ calculated by the third vector calculator 60 from the torque split current $i_q$*. The magnetic flux current controller 30b may output new magnetic flux split current obtained by subtracting the detected current value id calculated by the first vector calculator 20 from the magnetic flux split current $i_d$*.

A second vector calculator 40 may derive a voltage of the d axis and a voltage of the q axis based on the new torque split current and the new magnetic flux split current that are transmitted from the torque split current controller 30a and the magnetic flux current controller 30b, and an estimated velocity value, etc. derived by the first vector calculator 20. The second vector calculator 40 may output a 3-phase AC voltage based on the voltage of the d axis, the voltage of the q axis, and the estimated magnetic flux angle.

A pulse width modulation unit (PWM) 50 may perform space vector pulse width modulation (SVPWM) based on the 3-phase AC voltage transmitted by the second vector calculator 40 to output a gating signal for on/off control of switching devices (not shown) of the inverter unit 180.

The inverter unit 180 may convert a DC voltage applied from a DC power source (not shown) into a 3-phase AC voltage and may apply the 3-phase AC voltage to the BLDC motor 200. For example, the DC power source (not shown) may be a 12V or 24V battery of an automobile. The 3-phase AC voltage supplied to the BLDC motor 200 by the inverter unit 180 may include U-phase, V-phase, and W-phase voltages indicating voltages applied to U-phase, V-phase, and W-phase armature windings.

The BLDC motor 200 may include a rotor and a stator. The rotor may include a permanent magnet and the stator may include a coil (electromagnet). The BLDC motor 200 may rotate the rotor at predetermined angular velocity according to the 3-phase voltage transmitted from the inverter unit 180. The angular velocity ω of the rotor may be measured by an encoder (not shown) connected to the rotor and may be transmitted to the first vector calculator 20.

Figure 2:
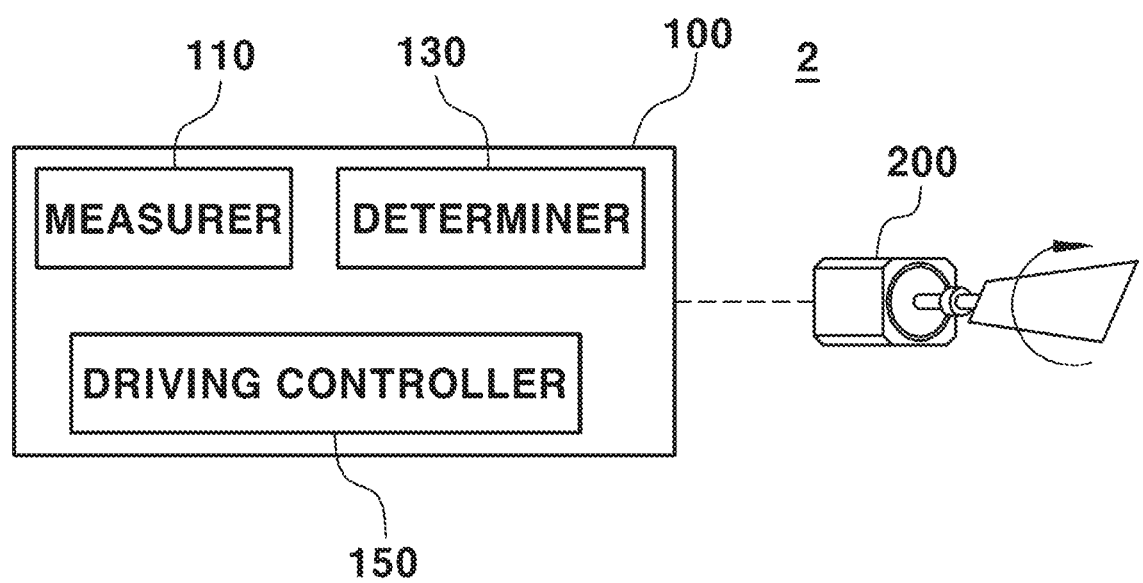
FIG. 2 is a block diagram of a brushless direct current (BLDC) motor overload detection apparatus according to an exemplary embodiment of the present disclosure.
Figure 3:
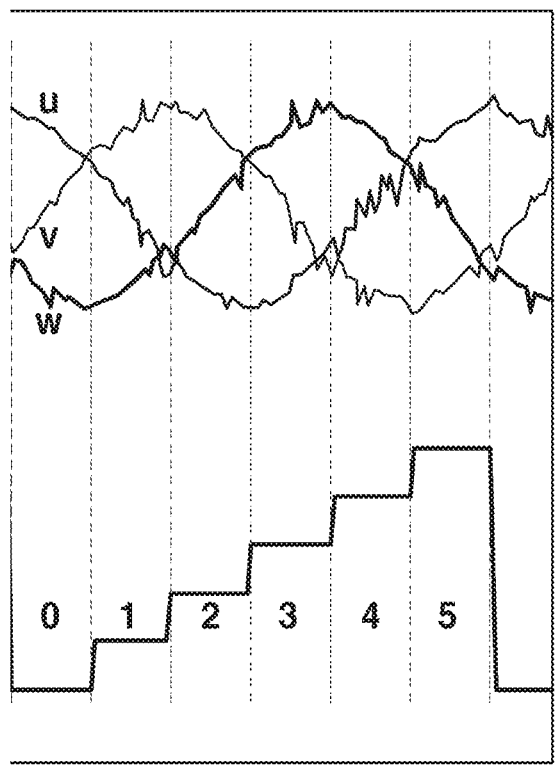
FIG. 3 is a diagram for explanation of deriving of a sector value using a 3-phase current value applied to a BLDC motor according to an exemplary embodiment of the present disclosure.
Figure 4:
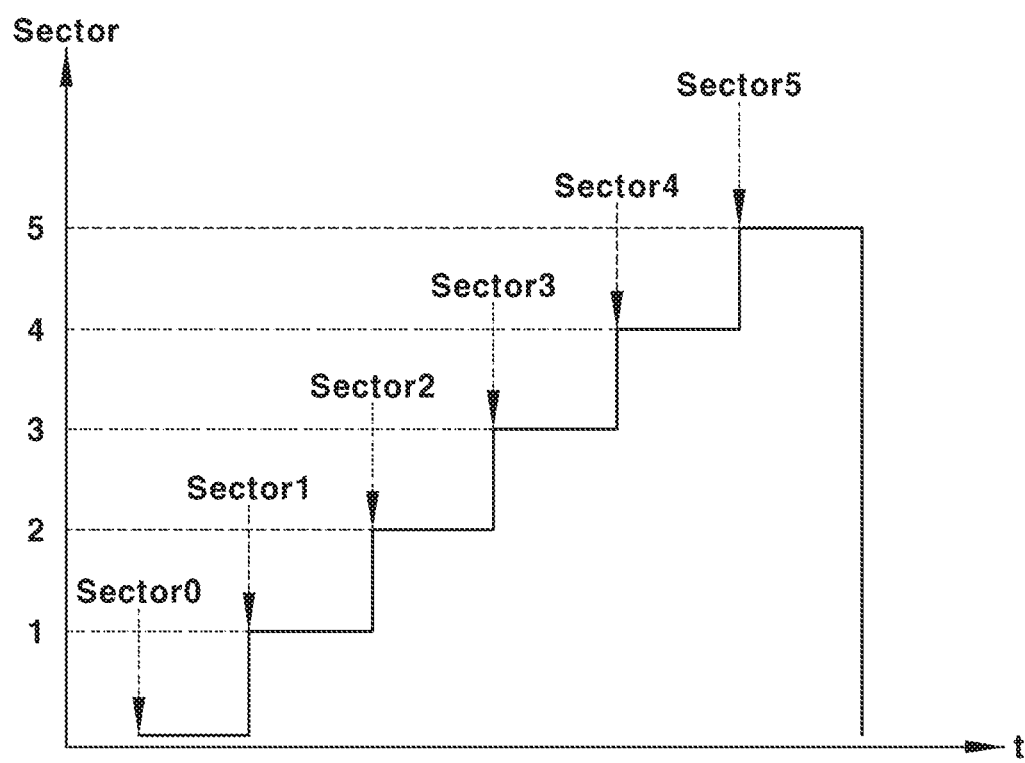
FIG. 4 is a diagram for explanation of a sector value according to an exemplary embodiment of the present disclosure.

FIG. 2 is a block diagram of a BLDC motor overload detection apparatus according to an exemplary embodiment of the present disclosure. FIG. 3 is a diagram for explanation of deriving of a sector value using a 3-phase current value applied to a BLDC motor according to an exemplary embodiment of the present disclosure. FIG. 4 is a diagram for explanation of a sector value according to an exemplary embodiment of the present disclosure.

Referring to FIGS. 2 to 4, a BLDC motor overload detection apparatus 2 may include the MCU 100, including a measurer 110, a determiner 130, and a driving controller 150, and the BLDC motor 200, controlled by the MCU 100. In this case, the measurer 110, the determiner 130, and the driving controller 150 are defined to be differentiated according to the functions of the MCU 100. The BLDC motor overload detection apparatus 2 may be applied to various motors such as an ultrahigh speed motor for an electric turbocharger of an automobile, an electric supercharger, a turbine generator, and an electric water pump.

The measurer 110 may measure a 3-phase current value applied to the BLDC motor 200 to derive a sector value matched with the 3-phase current value. The sector value may be a parameter matched with the 3-phase current value applied to the BLDC motor 200. The 3 phases (U, V, and W) of the BLDC motor 200 may be represented in a vector space. That is, when the sector vector is represented as an inverse vector of each phase, the sector vector may be represented in 6 spaces of sector 1 to 6, and when gate on/off of a 3-phase inverter is used, vectors in all sectors may be represented. In FIG. 3, the state of 3-phase current is divided into (p), (n), "+", and "−" depending on the flow direction of current based on a point with a current value of 0. The (p) indicates that current flows to "+" from "−" and (n) indicates that current flows to "−" from "+". Accordingly, the sector may be divided into 6 pieces. Referring to FIG. 4, a sector value in sector 0 may be 0, a sector value in sector 1 may be 1, a sector value in sector 2 may be 2, a sector value in sector 3 may be 3, a sector value in sector 4 may be 4, and a sector value in sector 5 may be 5. A sector value may be increased stepwise within one period of a 3-phase current value in a normal condition in which the BLDC motor 200 does not stall. A sector value according to a sector may be arbitrarily determined or may be a changeable number. That is, a sector value may be a parameter for checking whether the previous sector value and the current sector value are different.

The determiner 130 may compare a sector value derived by the measurer 110 and a previous sector value that is previously measured to determine whether the sector value is normal. That is, the determiner 130 may compare the current sector value and the previous sector value. For example, when the BLDC motor 200 does not stall, the current sector value may be sector 2, the previous sector value may be sector 1, and a difference between the current sector value and the previous sector value may be 1. However, when the BLDC motor 200 stalls, the difference between the current sector value and the previous sector value may not be 1. When the current sector value and the previous sector value are different by a predetermined number, the determiner 130 may determine that the BLDC motor 200 is normal, and when the current sector value and the previous sector value are not different by a predetermined number, the determiner 130 may determine that the BLDC motor 200 is abnormal. In this case, the predetermined number may be 1. That is, when the current sector value and the previous sector value are compared and the difference therebetween is 1, the determiner 130 may determine that the current sector value is normal, and when the current sector value and the previous sector value are compared and the difference therebetween is not 1, the determiner 130 may determine that the current sector value is abnormal.

When the current sector value is normal, the determiner 130 may determine that an error does not occur in the BLDC motor 200, and when the current sector value is abnormal, the determiner 130 may determine that an error occurs in the BLDC motor 200. However, the determiner 130 may not determine that the BLDC motor 200 stalls if a single error occurs in the BLDC motor 200. Here, stalling of the BLDC motor 200 may refer to the application of an excessive load to the BLDC motor 200, and for example, may indicate the case in which the BLDC motor 200 does not output maximum torque due to a fault.

For example, the determiner 130 may repeatedly determine whether the current sector value is normal, and as such, when a value obtained by adding an initialization value to the number of times an error occurs is greater than a predetermined threshold value, the determiner 130 may determine that the BLDC motor 200 stalls. The initialization value may be the value of cases in which an error does not occur even once. For example, the initialization value may refer to 0.

For example, when the number of times an error occurs in the BLDC motor 200 is and the value obtained by adding the initialization value to the number of times an error occurs is equal to or less than a predetermined threshold value, the determiner 130 may repeatedly determine whether the current sector value is normal. The determiner 130 may repeatedly determine that the current sector value is normal to determine whether the BLDC motor 200 stalls.

The driving controller 150 may control driving of the BLDC motor 200. When the determiner 130 determines that the BLDC motor 200 stalls, the driving controller 150 may perform control such that a velocity value of the BLDC motor 200 is 0.

According to an exemplary embodiment of the present disclosure, without a separate rotor position detection sensor, 3-phase current supplied to the BLDC motor 200 may be measured to derive a sector value matched with a phase current value and whether an error occurs in the BLDC motor 200 via comparison between the current sector value and the previous sector value. The BLDC motor overload detection apparatus 2 may repeatedly compare the current sector value with the previous sector value to count the number of times an error occurs and, when the number of times an error occurs is greater than a predetermined threshold value, it may be determined that the BLDC motor 200 stalls.

Figure 5:
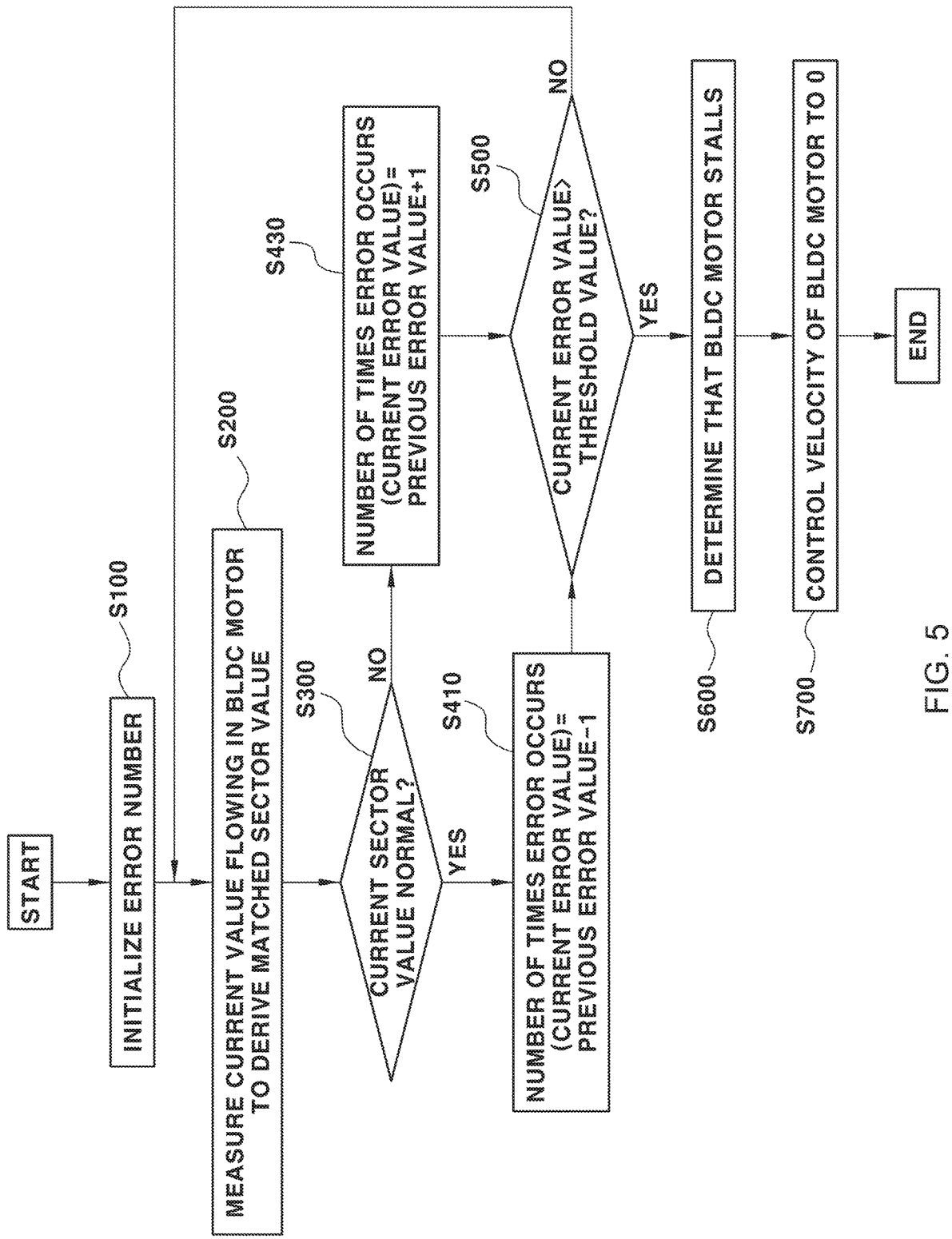
FIG. 5 is a flowchart for explanation of a BLDC motor overload detection method according to an exemplary embodiment of the present disclosure.

FIG. 5 is a flowchart for explanation of a BLDC motor overload detection method according to an exemplary embodiment of the present disclosure. For brevity of description, repeated portions of the description are omitted.

Referring to FIG. 5, the number of times an error occurs may be initialized based on the state in which the BLDC motor does not stall. That is, the number of times an error occurs may beset to 0 (S100).

A measurer may derive a sector value matched with a 3-phase current value applied to the BLDC motor. For example, a sector may be divided into 6 pieces and a sector value may be defined as a value of 0 to 5. The measurer may repeatedly derive a sector value (S200).

A determiner may determine whether a current sector value is normal. Whether the current sector value is normal may be determined via comparison between the current sector value and a previous sector value. When the current sector value and the previous sector value are different by a predetermined number, the determiner may determine that the current sector value is normal. When the current sector value and the previous sector value are not different by a predetermined number, the determiner may determine that the current sector value is abnormal (S300).

When the current sector value is normal, the determiner may determine that an error does not occur in the BLDC motor. In this case, the determiner may set a value obtained by subtracting a predetermined number from an initialization error value, to the current error value. When a previously determined error value is present, the determiner may set a value obtained by subtracting the predetermined number from the previous error value, to the current error value. In this case, the predetermined number may be changed by a designer (S410).

When the current sector value is abnormal, the determiner may determine that an error occurs in the BLDC motor. The case in which the current sector value is abnormal indicates that an error occurs in the BLDC motor and does not indicate that the BLDC motor stalls. In this case, the determiner may set a value obtained by adding a predetermined number to an initialization error value, to a current error value. When a previously determined error value is present, the determiner may set a value obtained by adding a predetermined number to the previous error value, to a current error value (S430).

The determiner may determine whether a current error value is greater than a threshold value. When the current error value is equal to or less than the threshold value, the determiner may re-compare the current sector value and the previous sector value. That is, when the current error value is equal to or less than the threshold value, the determiner may not determine that the BLDC motor stalls even if an error occurs in the BLDC motor. In this case, driving of the BLDC motor may not be stopped (S500).

When the current error value is greater than the threshold value, the determiner may determine that the BLDC motor stalls (S600). When the determiner determines that the BLDC motor stalls, a driving controller may control the velocity of the BLDC motor to 0 (S700).

Figure 6:
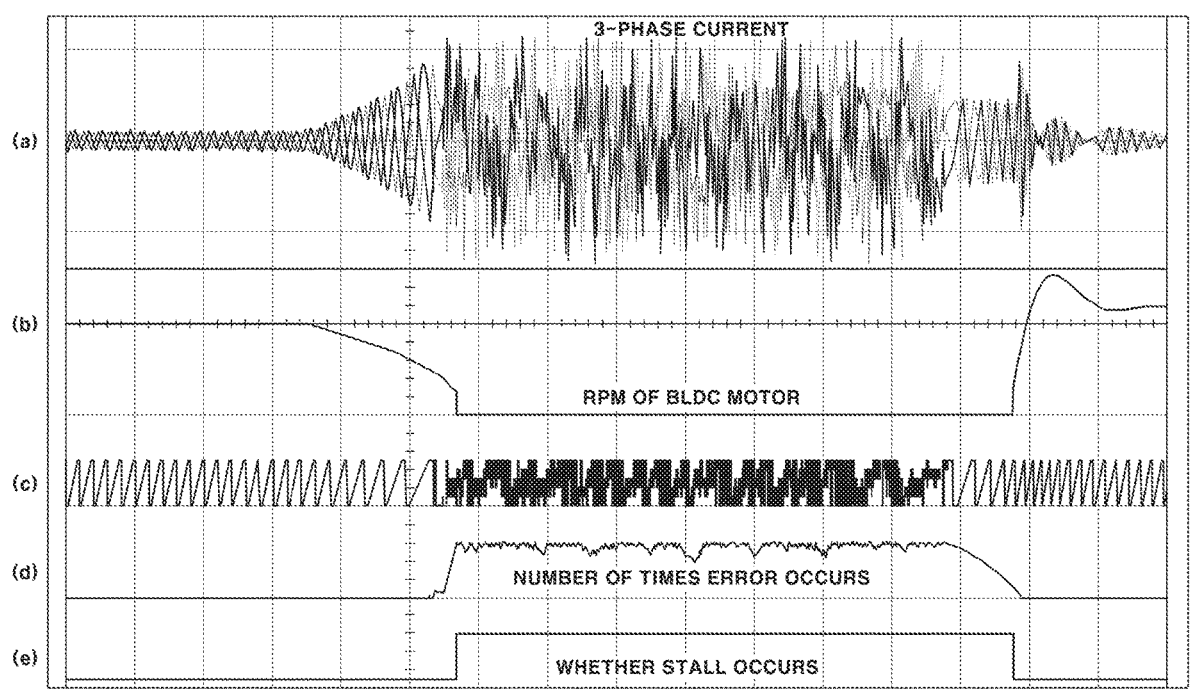
FIG. 6 is a diagram showing a waveform from which stalling of a BLDC motor is detected according to an exemplary embodiment of the present disclosure.

FIG. 6 is a diagram showing a waveform from which stalling of a BLDC motor is detected according to an exemplary embodiment of the present disclosure. In FIG. 6, (a) refers to 3-phase current supplied to the BLDC motor, (b) refers to the number of revolutions per minute (RPM), which is the rotation velocity per minute of the BLDC motor, (c) refers to a waveform indicating a change in sector value, (d) refers to the number of times an error occurs in the BLDC motor, and (e) refers to whether the BLDC motor stalls.

Referring to FIGS. 2 and 6, when the BLDC motor 200 stalls, a phase current value applied to the BLDC motor 200 may be changed. As the width of the phase current value is increased, a waveform of a sector value has constant amplitude, and then, has non-uniform amplitude. Before the BLDC motor 200 stalls, a waveform indicating a sector value may have a constant period and constant amplitude. When a difference between a current sector value and a previous sector value is not constant in a waveform indicating a sector value, the determiner 130 may determine that the BLDC motor 200 stalls. Accordingly, the driving controller 150 may control RPM of the BLDC motor 200 to 0. Referring to lines (b), (d), and (e), when the BLDC motor 200 stalls, the RPM of the BLDC motor 200 may be reduced, and when the number of times an error occurs is greater than a threshold value, the RPM of the BLDC motor 200 may be controlled to 0.

According to an exemplary embodiment of the present disclosure, without a separate rotor position detection sensor, 3-phase current supplied to the BLDC motor may be measured to derive a sector value matched with a phase current value, and whether an error occurs in the BLDC motor may be determined via comparison between a current sector value and a previous sector value. The BLDC motor overload detection apparatus may repeatedly compare the current sector value with the previous sector value to count the number of times an error occurs, and when the number of times an error occurs is greater than a predetermined threshold value, it may be determined that the BLDC motor stalls.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. An apparatus for detecting overload of a brushless direct current (BLDC) motor, comprising:
    a measurer for measuring a 3-phase current value applied to the BLDC motor to derive a sector value matched with the 3-phase current value;
    a determiner for determining whether the sector value is normal by comparing the sector value derived by the measurer with a previous sector value that is previously measured; and
    a driving controller for controlling driving of the BLDC motor according to whether the BLDC motor has a fault, determined by the determiner,
    wherein, when the sector value and the previous sector value are different by a predetermined number, the determiner determines that the BLDC motor is normal, and when the sector value and the previous sector value are not different by the predetermined number, the determiner determines that the BLDC motor is abnormal.

2. The apparatus of claim 1, wherein the sector value is increased stepwise within one period of the 3-phase current value when the BLDC motor is in a normal condition.

3. The apparatus of claim 1, wherein:
    upon determining that the BLDC motor is abnormal, the determiner determines that an error occurs in the BLDC motor; and
    when a value obtained by adding the number of times an error occurs to an initialization value is greater than a predetermined threshold value, the determiner determines that the BLDC motor stalls.

4. The apparatus of claim 3, wherein the determiner applies a weight to the number of times an error occurs and determines whether a current error value, which is a value obtained by adding the number of times an error occurs to the initialization value, is greater than the predetermined threshold value.

5. The apparatus of claim 1, wherein:
    upon determining that the BLDC motor is normal, the determiner determines that an error does not occur in the BLDC motor; and
    when a value obtained by adding the number of times an error occurs to an initialization value is equal to or less than a predetermined threshold value, the determiner repeatedly determines whether the sector value is normal.

6. A method of detecting overload of a brushless direct current (BLDC) motor, the method comprising:
    measuring a 3-phase current value applied to the BLDC motor to derive a sector value matched with the 3-phase current value;
    determining whether the sector value is normal or abnormal by comparing the derived sector value and a previous sector value that is previously measured;
    when the sector value is abnormal, determining that an error occurs and counting the number of times an error occurs; and
    determining whether the BLDC motor stalls based on the number of times an error occurs;
    wherein the determining whether the sector value is normal or abnormal includes, when the sector value and the previous sector value are different by a predetermined number, determining that the BLDC motor is normal, and when the sector value and the previous sector value are not different by the predetermined number, determining that the BLDC motor is abnormal.

7. The method of claim 6, wherein the determining whether the BLDC motor stalls based on the number of times an error occurs includes determining that the BLDC motor stalls when the number of times an error occurs is equal to or greater than a predetermined threshold value.

8. The method of claim 6, wherein the determining that an error occurs and counting of the number of times an error occurs when the sector value is abnormal includes:
    subtracting the number of times an error occurs corresponding to a predetermined number from a previous error value when the BLDC motor is normal; and
    adding the number of times an error occurs corresponding to a predetermined number to the previous error value when the BLDC motor is abnormal.

9. The method of claim 8, wherein the determining whether the BLDC motor stalls based on the number of times an error occurs includes determining whether a current error value obtained by adding or subtracting the number of times an error occurs corresponding to a predetermined number, to or from the previous error value, is equal to or greater than a predetermined threshold value.

10. The method of claim 6, further comprising re-comparing the current error value and the previous error value when the current error value is equal to or less than a predetermined threshold value.

11. The method of claim 6, further comprising controlling velocity of the BLDC motor to 0 upon determining that the BLDC motor stalls based on the number of times an error occurs.

* * * * *